(12) United States Patent
Decker (10) Patent No.: US 9,194,502 B2
(45) Date of Patent: Nov. 24, 2015

(54) METHODS AND APPARATUS FOR REMOVING FLUID FROM FLUID VALVES

(75) Inventor: Trent Decker, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 496 days.

(21) Appl. No.: 12/786,119

(22) Filed: May 24, 2010

(65) Prior Publication Data

US 2011/0283817 A1   Nov. 24, 2011

(51) Int. Cl.
*F16K 27/02* (2006.01)
*F16K 3/24* (2006.01)
*F16K 39/02* (2006.01)
*F16N 7/40* (2006.01)

(52) U.S. Cl.
CPC ............... *F16K 3/246* (2013.01); *F16K 27/02* (2013.01); *F16K 39/024* (2013.01); *F16N 7/40* (2013.01)

(58) Field of Classification Search
CPC ..... F16K 5/0605; F16K 11/044; F16K 11/22; F16K 1/2007; F16K 5/0647; F16K 5/184; F16K 5/201
USPC .................................................. 251/366, 369
See application file for complete search history.

(56) References Cited

U.S. PATENT DOCUMENTS

| | | | |
|---|---|---|---|
| 2,072,965 A * | 3/1937 | Robinson et al. | 251/188 |
| 2,389,194 A * | 11/1945 | Hamer | 137/614.11 |
| 3,084,554 A * | 4/1963 | Perilloux | 73/863.73 |
| 3,322,890 A * | 5/1967 | Kennedy et al. | 174/152 R |
| 3,339,411 A * | 9/1967 | Riffie | 73/304 R |
| 3,439,897 A | 4/1969 | Priese et al. | |
| 3,521,667 A * | 7/1970 | Johnson | 137/454.6 |
| 3,974,861 A * | 8/1976 | Goto et al. | 137/627.5 |
| 4,046,181 A * | 9/1977 | Barnsdale | 411/180 |
| 4,460,007 A | 7/1984 | Pirkle | |
| 4,499,641 A * | 2/1985 | Fleckenstein | 29/25.41 |
| 4,756,338 A * | 7/1988 | Guyatt et al. | 138/99 |
| 4,811,160 A * | 3/1989 | Fleckenstein | 361/284 |
| 4,823,752 A * | 4/1989 | Uuskallio | 123/400 |
| 5,131,795 A * | 7/1992 | Kobusch | 411/178 |
| 5,549,276 A * | 8/1996 | Pittman et al. | 251/214 |
| 6,119,960 A * | 9/2000 | Graves | 239/92 |

(Continued)

FOREIGN PATENT DOCUMENTS

GB    761319    11/1956
GB    946585    1/1964

(Continued)

OTHER PUBLICATIONS

"Type 655 and 655R Actuators for Self-Operated Control", Emerson Process Management, Jul. 2007.*

(Continued)

*Primary Examiner* — David A Rogers (74) *Attorney, Agent, or Firm* — Hanley, Flight & Zimmerman, LLC (57) ABSTRACT

Methods and apparatus for removing fluid from fluid valves are described. An example apparatus for controlling fluid flow includes a fluid regulator having a body defining an inlet port, an outlet port and an aperture therebetween. The body further defining a bore fluidly coupled to a valve and at least one of the outlet port or the inlet port. The valve is to enable fluid contained within the body to be removed therefrom.

28 Claims, 5 Drawing Sheets

(56) References Cited

U.S. PATENT DOCUMENTS

| | | | |
|---|---|---|---|
| 6,196,262 B1* | 3/2001 | Giacomini | 137/559 |
| 6,491,109 B2* | 12/2002 | Christenson et al. | 169/17 |
| 6,550,347 B2* | 4/2003 | Bradley | 73/863.21 |
| 6,557,576 B2* | 5/2003 | Walrath et al. | 137/14 |
| 6,585,943 B1* | 7/2003 | Sanford et al. | 422/307 |
| 6,712,088 B2* | 3/2004 | Gamou et al. | 137/341 |
| 7,249,751 B2* | 7/2007 | Hall et al. | 251/214 |
| 7,617,843 B1 | 11/2009 | Al-Oriar | |
| 7,789,106 B2* | 9/2010 | Reck | 137/625.47 |
| 7,819,613 B2* | 10/2010 | Strom | 411/178 |
| 8,136,545 B2* | 3/2012 | Jablonski | 137/492 |
| 8,439,617 B2* | 5/2013 | Strom | 411/386 |
| 2002/0021948 A1* | 2/2002 | Stumpf et al. | 411/180 |
| 2003/0192593 A1* | 10/2003 | Walrath et al. | 137/360 |
| 2007/0001143 A1* | 1/2007 | Konishi et al. | 251/149.8 |
| 2007/0290151 A1* | 12/2007 | Muller | 251/26 |
| 2008/0067462 A1* | 3/2008 | Miller et al. | 251/149.1 |
| 2008/0169443 A1* | 7/2008 | Loloff | 251/315.1 |
| 2008/0202600 A1* | 8/2008 | Peattie et al. | 137/429 |
| 2008/0258092 A1* | 10/2008 | Pettinaroli et al. | 251/149 |
| 2009/0026405 A1* | 1/2009 | Sheppard et al. | 251/364 |
| 2009/0127486 A1* | 5/2009 | O'Reilly | 251/129.04 |
| 2009/0217734 A1* | 9/2009 | Moshfegh et al. | 73/23.2 |
| 2010/0139794 A1* | 6/2010 | Reck | 137/625.17 |
| 2010/0270490 A1* | 10/2010 | Roper et al. | 251/337 |
| 2010/0327208 A1* | 12/2010 | Doutt | 251/333 |
| 2011/0155250 A1* | 6/2011 | Nannan et al. | 137/1 |
| 2011/0174381 A1* | 7/2011 | Foust et al. | 137/1 |
| 2011/0260090 A1* | 10/2011 | Jones | 251/315.05 |
| 2011/0284102 A1* | 11/2011 | Schneider | 137/505.47 |

FOREIGN PATENT DOCUMENTS

| | | |
|---|---|---|
| JP | S4813503 | 4/1973 |
| JP | S5030120 | 3/1975 |
| JP | H04054390 | 2/1992 |
| JP | H07269725 | 10/1995 |
| WO | 2005031200 | 4/2005 |

OTHER PUBLICATIONS

"Professional Thread Repair System Screw Thread Inserts", Time Fastener Co., Mar. 2009.*

Patent Cooperation Treaty, "International Search Report," issued by the International Searching Authority in connection with related PCT application No. PCT/US2011/036853, mailed Sep. 15, 2011 (5 pages).

Patent Cooperation Treaty, "Written Opinion of the International Searching Authority," issued by the International Searching Authority in connection with related PCT application No. PCT/US2011/036853, mailed Sep. 15, 2011 (6 pages).

State Intellectual Property Office of the People's Republic of China, "The First Office Action," issued in connection with Chinese Application No. 201180035524.9, Jan. 6, 2014, 15 pages.

The State Intellectual Property Office of the People's Republic of China, "The Second Office Action", issued in connection with Chinese Application No. 201180035524.9, Sep. 10, 2014, 12 pages.

Japanese Patent Office, "Notice of Reasons for Refusal", issued in connection with Japanese Application No. 2013-512661, mailed on Jan. 28, 2015, 19 pages.

* cited by examiner

METHODS AND APPARATUS FOR REMOVING FLUID FROM FLUID VALVES

FIELD OF THE DISCLOSURE

This patent relates to fluid control processes and, more specifically, to methods and apparatus for removing fluid from fluid valves.

BACKGROUND

Process control systems utilize a variety of field devices to control process parameters. Fluid valves (e.g., fluid regulators) are commonly distributed throughout process control systems to control the pressures of various fluids (e.g., liquids, gasses, etc.). In some instances, maintenance is performed on these fluid valves. Such maintenance may involve the removal of fluid from the body of the fluid valves or regulators and/or other portions of the process control system.

SUMMARY

An apparatus for controlling fluid flow includes a fluid regulator having a body defining an inlet port, an outlet port and an aperture therebetween. The body further defining a bore fluidly coupled to a valve and at least one of the outlet port or the inlet port. The valve is to enable fluid contained within the body to be removed therefrom.

An example method of removing fluid contained within a fluid regulator includes opening a valve. The valve is fluidly coupled to a bore defined by a body of the fluid regulator. The fluid regulator comprises an inlet port, an outlet port and an aperture therebetween. The method includes closing the valve to substantially prevent fluid flow from within the fluid regulator.

Another example apparatus for controlling fluid flow includes a fluid regulator having a body defining an inlet port, an outlet port and an aperture therebetween. The body further defining a bore fluidly coupled to a valve and at least one of the outlet port or the inlet port. The valve is to enable fluid contained within the body to be removed therefrom. The apparatus includes a process-controlled actuator to actuate the valve to automatically obtain a sample of the fluid contained within the body.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to example methods and apparatus for removing fluid from a fluid valve such as a fluid regulator and/or other process control devices. Fluid control processes typically include process control devices such as regulators, valves, pumps, etc. These devices may be at least partially filled with process fluid during normal operation. To perform maintenance on these process control devices as well as other parts of a process control system in which the devices operate, it may be advantageous to remove some or substantially all of the process fluid from inside the devices (e.g., cavities within a fluid regulator body). In some examples, fluid removal or drain valves are coupled or otherwise integrated with the example process control devices described herein. Integrating fluid removal or drain valves with fluid control devices such as valve, regulators, etc. can substantially reduce the run length (e.g., the length of piping interconnecting various fluid control devices) of the fluid control processes and can eliminate the need for devices or components that are typically required in some known fluid control processes.

In some examples described herein, the example fluid removal apparatus may also be implemented with example sampling systems. The sampling systems may facilitate automatic sampling and/or testing of process fluid contained within one or more fluid control devices and/or, more generally, within the process control system in which the one or more fluid control devices are operative. Such sampling and/or monitoring of process fluid may ensure quality of the process fluid is maintained, for example.

Figure 1:
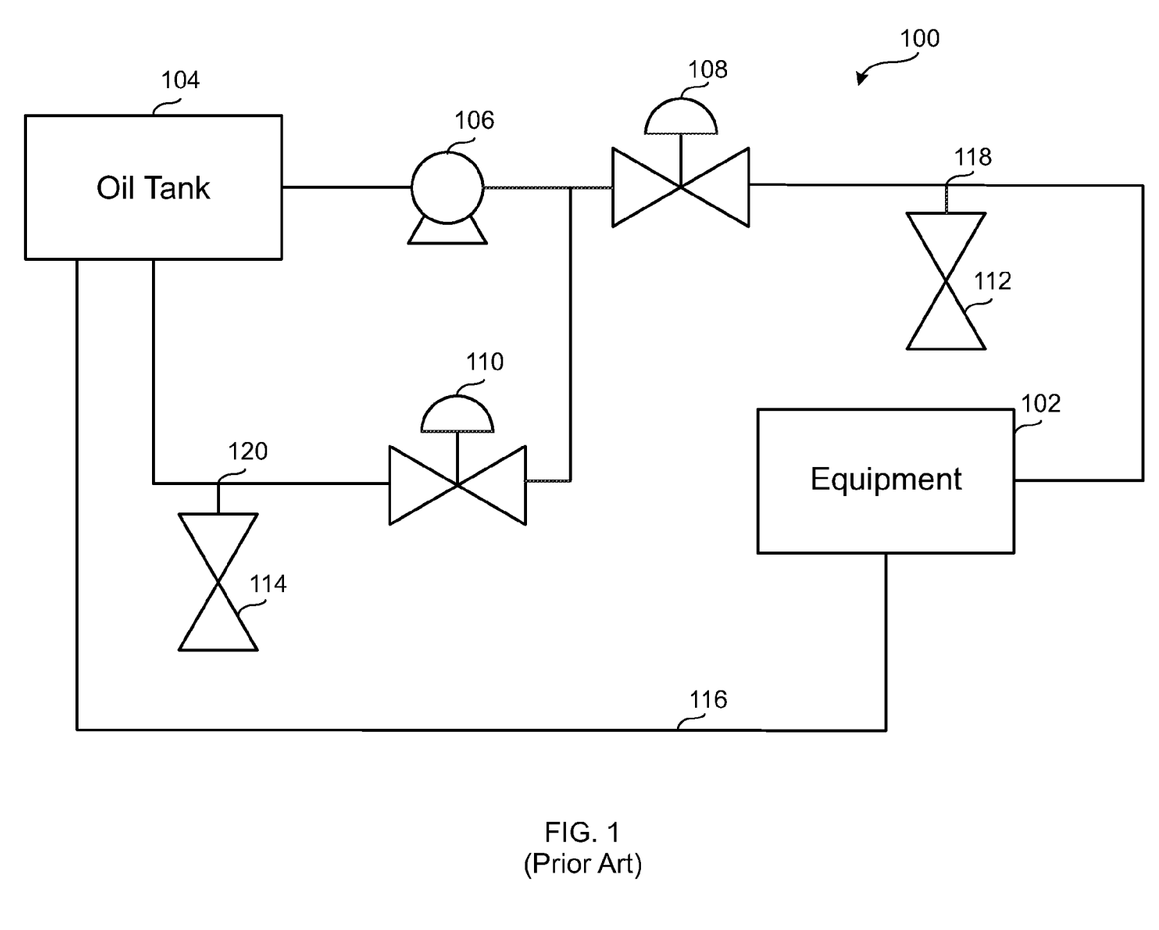
FIG. 1 depicts a known lubricating system.

FIG. 1 depicts a known lubricating system 100. The lubricating system 100 is configured to lubricate equipment 102. The equipment 102 may be a turbine, an engine, a pump, etc. The lubricating system 100 includes an oil tank, skid or reservoir 104, a pump 106, first and second regulators 108 and 110, first and second valves 112 and 114 and flowlines 116. The oil tank 104 may store lubrication fluid. The pump 106 may pump lubrication fluid from the oil tank 104 through the flowlines 116 to lubricate the equipment 102. The lubrication fluid may be pumped from the oil tank 104 to the equipment 102 and back to the oil tank 104, for example. The first regulator 108 may be configured as a pressure reducing regulator to regulate the flow of lubrication fluid to the equipment 102. The second regulator 110 may be configured as a back pressure regulator to regulate back pressure at the first regulator 108, for example. The first valve 112 enables lubrication fluid to flow out of the lubricating system 100 prior to servicing the first regulator 108, for example. Similarly, the second valve 114 enables lubrication fluid to flow out of the lubricating system 100 prior to servicing the second regulator 110, for example.

In practice, when lubrication fluid is flowing through the lubricating system 100, the regulators 108 and 110 are at least partially filled with lubrication fluid. In some instances, maintenance is performed on the regulators 108 and/or 110. It is more difficult to repair the regulators 108 and 110 if they are filled with lubrication fluid. By actuating the first valve 112, lubrication fluid within the first regulator 108 may be removed or drained. Likewise, by actuating the second valve 114, lubrication fluid within the second regulator 110 may be removed or drained.

In the example depicted in FIG. 1, the first valve 112 is downstream and at distance from the first regulator 108, and the second valve 114 is downstream and at distance from the second regulator 110. Couplings or spool pieces 118 and 120 may be utilized to couple the valves 112 and 114 to the lubricating system 100. Positioning the valves 112 and 114 at a distance from the respective regulators 108 and 110 increases the run length of the flowlines 116 and requires numerous components (e.g., the couplings or spool pieces 118 and 120) to be purchased and installed. Space may be limited in some facilities or locations where the lubrication system 100 is implemented. Thus, increasing the run length of the flowlines 116 by including the spool pieces 118 and 120 may make planning and/or installing the lubrication system 100 more difficult and costly.

Figure 2:
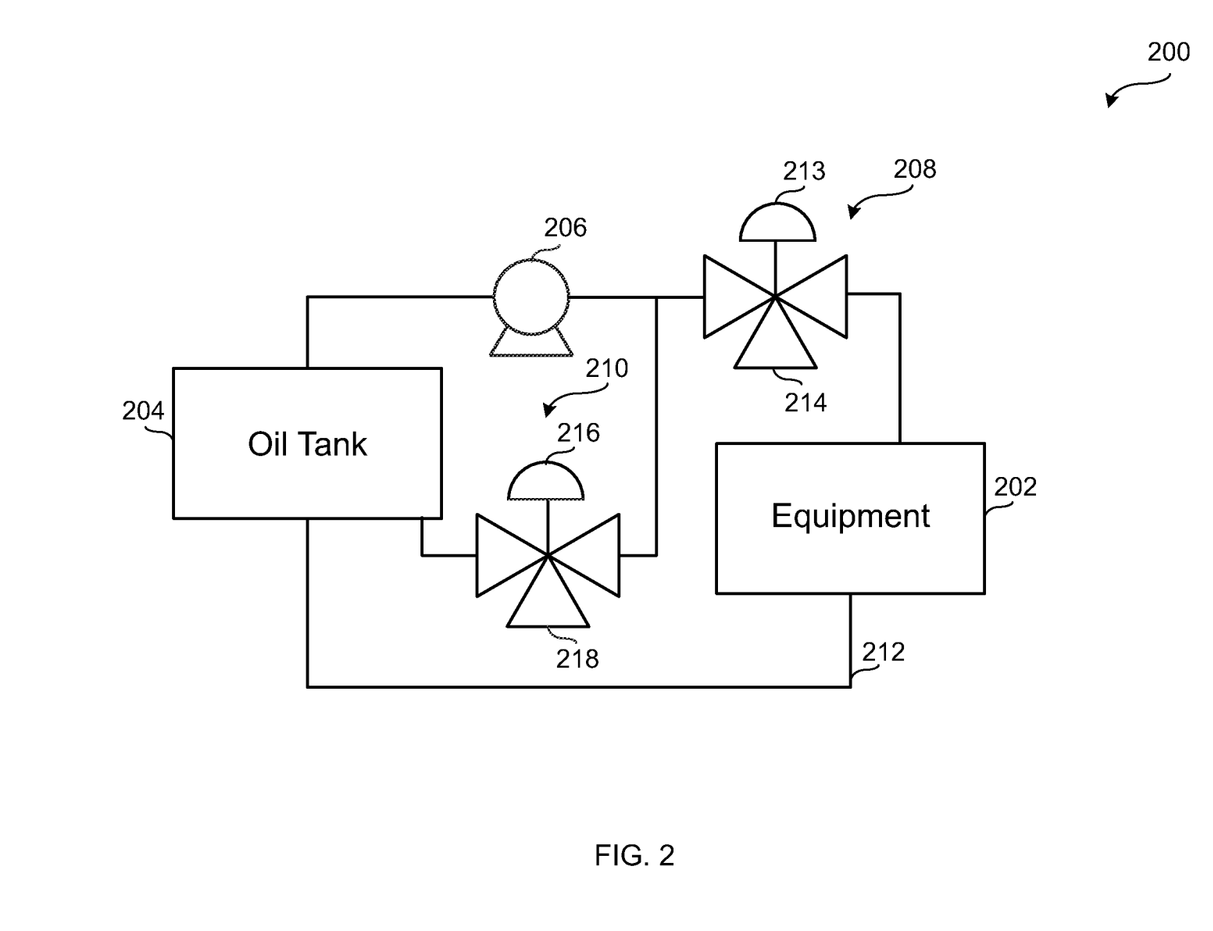
FIG. 2 depicts an example lubricating system having example fluid regulators and related fluid removal apparatus.

FIG. 2 depicts an example lubricating system 200 having example fluid regulators 213 and 216 and related fluid removal or drain valve apparatus 214 and 218. The lubricating system 200 may provide similar functionality to that of the known lubricating system 100 described above. However, using the examples described herein, the example lubricating system 200 includes fewer components and/or requires significantly less space to implement as compared to the known lubricating system 100, for example. In some examples, the lubricating system 200 is configured to lubricate equipment 202. The equipment may be a turbine, an engine, a pump, etc. The lubricating system 200 may include an oil tank, skid or reservoir 204, a pump 206, example first and second fluid control apparatus 208 and 210 and flowlines 212. The oil tank 204 may store lubrication fluid. The pump 206 may pump lubrication fluid from the oil tank 204 through the flowlines 212 to lubricate the equipment 202. The lubrication fluid may be pumped from the oil tank 204 to the equipment 202 and back to the oil tank 204, for example.

The example first apparatus 208 includes the example first fluid regulator 213 and the example first fluid removal or drain valve 214. In some examples, the first fluid regulator 213 may be configured as a pressure reducing regulator to regulate the flow of lubrication fluid to the equipment 202. However, the first fluid regulator 213 may be configured differently. For example, the first fluid regulator 213 may instead be any other device used in fluid control processes such as a valve, a pump, etc. The first fluid removal or drain valve 214 may enable lubrication fluid to flow out of the first fluid regulator 213 prior to servicing the first fluid regulator 213 and/or the first apparatus 208, for example. In some examples, the first fluid removal or drain valve 214 may be coupled or otherwise integrated with the first fluid regulator 213 and may be positioned substantially below the first fluid regulator 213 to facilitate complete draining of any process fluid contained therein. In some examples, the face-to-face dimensions of the first apparatus 208 may be similar to the face-to-face dimensions of the known regulator 108 of FIG. 1. However, in contrast to the known regulator 108, which only provides regulating functionality to the lubricating system 100, the example first apparatus 208 provides both regulating and fluid removal or draining functionality to the example lubricating system 200. By implementing the example lubricating system 200 with the example first apparatus 208 instead of the known regulator 108 spaced from the known valve 112, the spool piece 118 may be eliminated and the run length of the flowline 212 may be significantly reduced, for example.

The example second apparatus 210 includes the example second fluid regulator 216 and the example second fluid removal or drain valve 218. In some examples, the second fluid regulator 216 may be configured as a back pressure regulator to regulate back pressure at the first apparatus 208. However, the second fluid regulator 216 may be configured differently. For example, the second fluid regulator 216 may instead be any other device used in fluid control processes such as a valve, a pump, etc. The second fluid removal or drain valve 218 may enable lubrication fluid to flow out of the second fluid regulator 216 prior to servicing the second fluid regulator 216 and/or the second apparatus 210, for example. In some examples, the second fluid removal or drain valve 218 may be coupled or otherwise integrated with the second fluid regulator 216. In some examples, the second fluid removal or drain valve 218 may be positioned substantially below the second fluid regulator 216 to facilitate complete draining of any process fluid contained therein. In some examples, the face-to-face dimensions of the second apparatus 210 may be similar to the face-to-face dimensions of the known regulator 110 of FIG. 1. However, in contrast to the known regulator 110, which only provides regulating functionality to the lubricating system 100, the example second apparatus 210 provides both regulating and fluid removal or draining functionality to the example lubricating system 200. By implementing the example lubricating system 200 with the example second apparatus 210 instead of the known regulator 110 spaced from the known valve 114, the spool piece 120 may be eliminated and the run length of the flowline 212 may be significantly reduced.

In practice, when lubrication fluid is flowing through the lubricating system 200, the fluid regulators 213 and 216 of the respective apparatus 208 and 210 are at least partially filled with lubrication fluid. In some instances, maintenance is performed on the fluid regulators 213 and/or 216. However, it is more difficult to repair the fluid regulators 213 and 216 if they are filled with lubrication fluid. By actuating the first fluid removal or drain valve 214, lubrication fluid within the first fluid regulator 213 may be removed or drained. Similarly, by actuating the second fluid removal or drain valve 218, lubrication fluid within the second fluid regulator 216 may be removed or drained.

Figure 3:
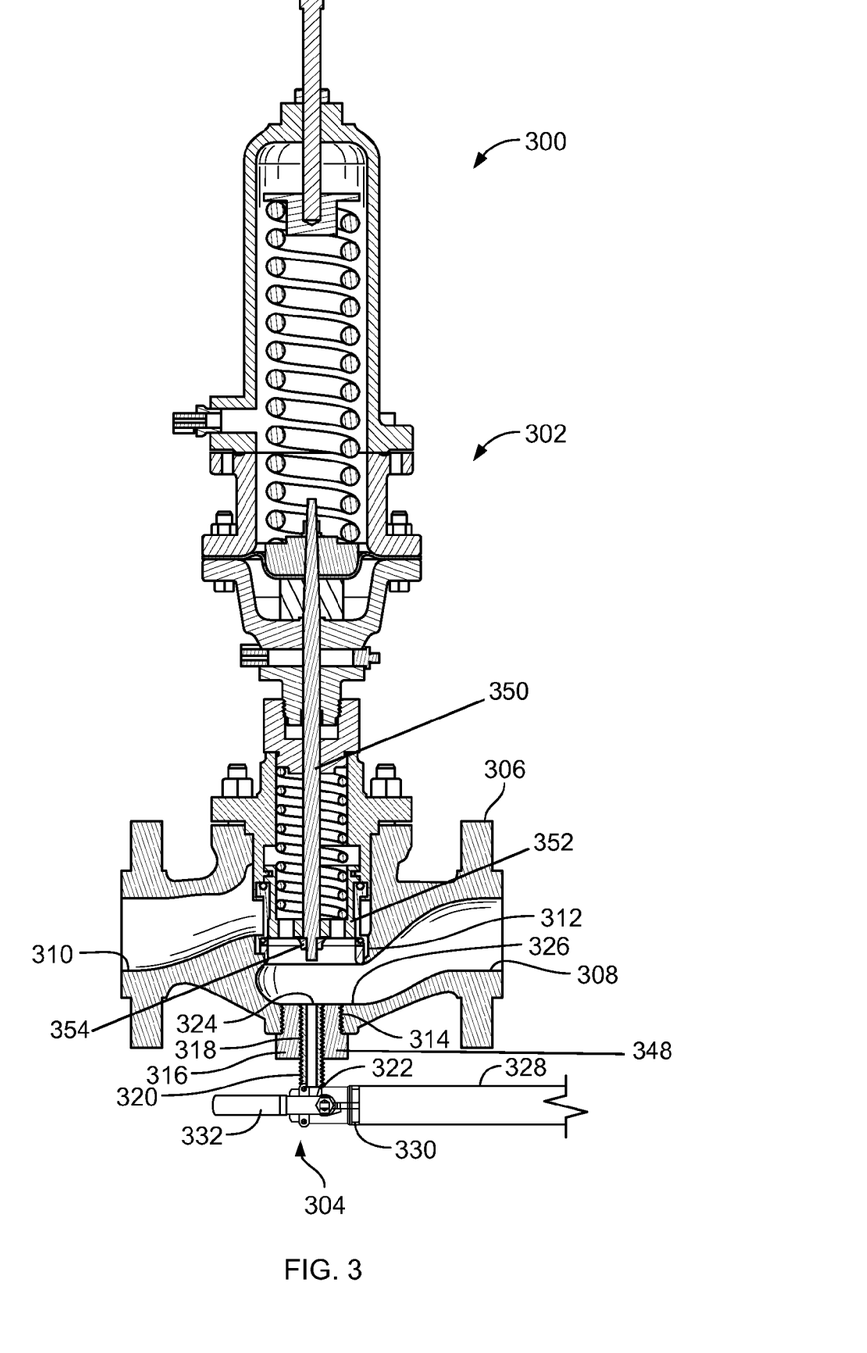
FIG. 3 depicts an example fluid regulator and drain valve apparatus that may be used to implement the example fluid removal apparatus described herein.

FIG. 3 depicts an example fluid regulator and drain valve apparatus 300 that may be used to implement the example fluid removal apparatus described herein. The example apparatus 300 includes an example fluid regulator 302 and an example fluid removal or drain valve 304. The fluid regulator 302 may be configured as a pressure reducing regulator, a back pressure regulator, etc. The fluid removal or drain valve 304 may be a ball valve, a shutoff valve, etc.

The fluid regulator 302 includes a body 306 defining an inlet port 308, an outlet port 310 and an aperture 312 therebetween. In some examples, the body 306 defines a threaded aperture 314 that is threadingly engaged by a plug 316. In some examples, the plug 316 includes a flange 348. In some examples, the plug 316 defines a bore 318 that enables the inlet port 308 and/or the outlet port 310 to be fluidly coupled to the valve 304 via a coupling or pipe 320. In some examples, the coupling 320 threadingly engages the bore 318 and threadingly engages a port 322 of the valve 304. As clearly depicted in FIG. 3, because the plug 316 threadably engages the port 314, the plug 316 can be unthreaded from the port 314. Also, as clearly shown in FIG. 3, a stem 350 is coupled to a valve plug 352 by a faster 354. If the plug 316 is unthreaded from the port 314, access is provided to the fastener 354. While the example apparatus 300 illustrates the fluid removal or drain valve 304 as coupled to the fluid regulator 302 via the coupling 320, the fluid removal or drain valve 304 may be integrally coupled with the fluid regulator 302. For example, the fluid removal or drain valve 304 may be configured as a port (not shown) positioned within or partially within the bore 318. The port may include an adapter (e.g., a quick-disconnect coupling). In such examples, the fluid removal or drain valve 304 may enable fluid flow therethrough when a hose or flowline is coupled to the adapter. An opening 324 of the bore 318 may be positioned adjacent to a surface 326 of the inlet port 308 to enable a majority of fluid contained within the fluid regulator 302 to be drained when the valve 304 is opened.

In practice, when fluid is flowing through a system (e.g., the lubricating system 200) to which the fluid regulator 302 is coupled, the fluid regulator 302 is at least partially filled with fluid. In some instances, maintenance may need to be performed on the fluid regulator 302. To drain fluid from the fluid regulator 302, the apparatus 300 may be isolated using other valves (not shown) of the system. In some examples, a flowline or hose 328 may be coupled to a quick-disconnect coupling 330 of the valve 304. A handle 332 of the valve 304 may be actuated to open the valve 304 and enable fluid flow therethrough. The fluid flowing from the fluid regulator 302 through the hose 328 may be saved for later use or discarded, for example. After the fluid contained within the fluid regulator 302 has been drained or a desired amount has been removed, the handle 332 may be actuated to close the fluid removal or drain valve 304 to prevent fluid flow therethrough. The hose 328 may then be decoupled from the quick-disconnect coupling 330.

Figure 4:
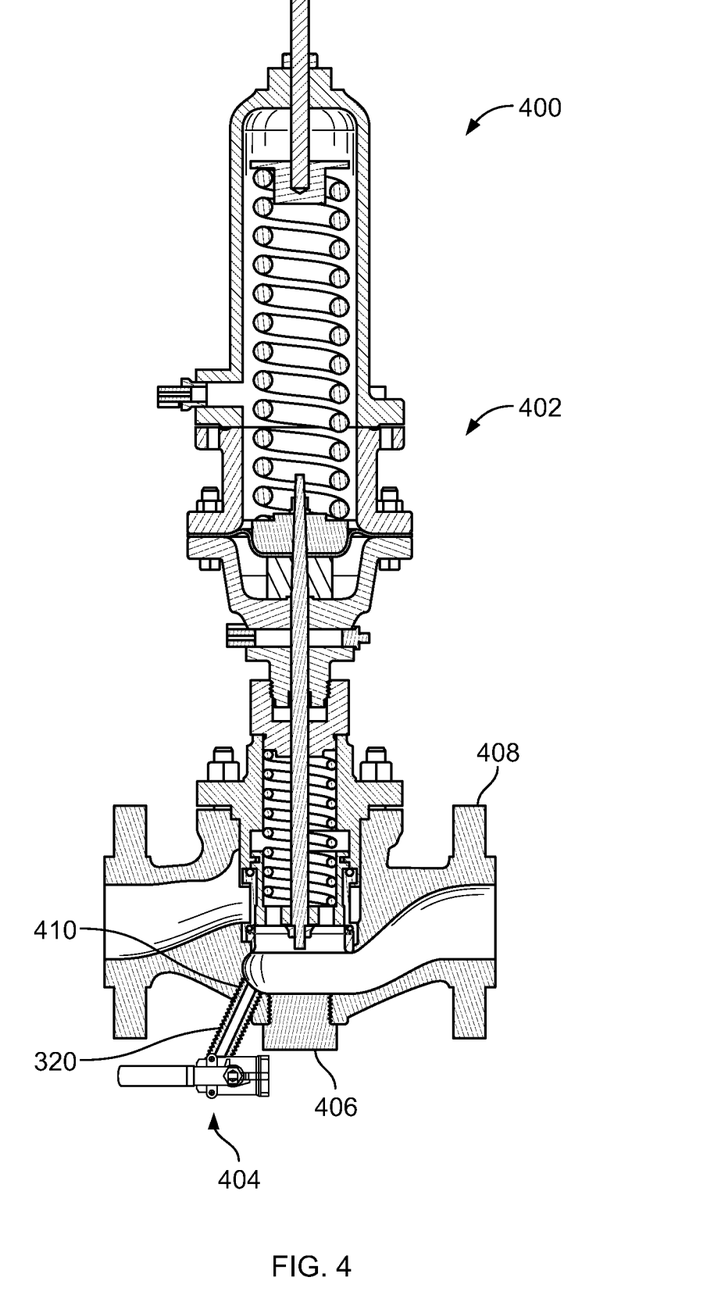
FIG. 4 depicts another example fluid regulator and drain valve apparatus that may be used to implement the example fluid removal apparatus described herein.

FIG. 4 depicts another example fluid regulator and drain valve apparatus 400 that may be used to implement the example fluid removal apparatus described herein. The example apparatus 400 includes an example fluid regulator 402 and an example fluid removal or drain valve 404. The example apparatus 400 is similar to the example apparatus 300 described above. However, in contrast, instead of defining a borehole through a plug 406, a body 408 of the fluid regulator 402 defines a bore 410. The bore 410 may be positioned at any location on the body 408 such that the coupling 320 and/or the valve 404 may be differently positioned relative to the fluid regulator 402.

Figure 5:
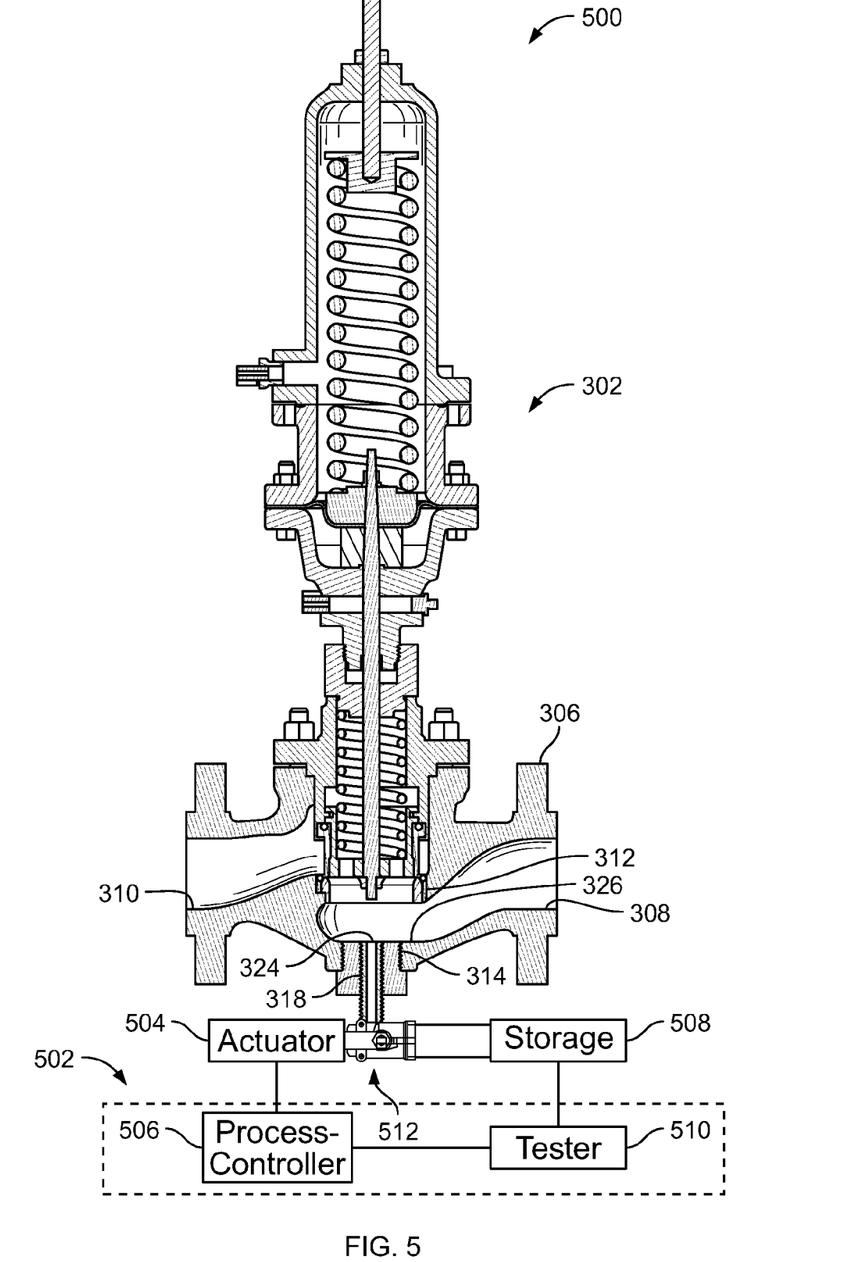
FIG. 5 depicts another example fluid removal apparatus that includes an example automatic fluid sampling system.

FIG. 5 depicts another example fluid removal apparatus 500 that includes an example automatic fluid sampling system 502. Implementing the examples described herein with the example sampling system 502 enables lubrication fluid to be automatically sampled and/or tested to ensure quality. By monitoring the lubrication fluid, premature or overdue changes or flushes of the system (e.g., the lubricating system 200) may be prevented, for example. In some examples, fluid samples may be removed automatically from the fluid regulator 302. In some examples, fluid samples taken from the fluid regulator 302 may be automatically tested.

The sampling system 502 includes an actuator 504, a process-controller 506, a fluid storage 508 and a fluid tester 510. The process-controller 506 may cause the actuator 504 to actuate a fluid removal or drain valve 512. Actuating the fluid removal or drain valve 512 enables fluid to flow from the fluid regulator 302 to the fluid storage 508. In some examples, the process-controller 506 may cause the valve 512 to be actuated based on a predetermined time interval. The time interval may be associated with a schedule to obtain a sample of fluid contained within the fluid regulator 302 and/or the system to which the fluid regulator 302 is coupled. The fluid sample may be stored within the fluid storage 508. In some examples, the fluid storage 508 may include a plurality of storage containers (e.g., 2, 3, 4, etc.) where the obtained fluid sample(s) may be stored. In some examples, the fluid tester 510 may test a portion of the sample contained in one of the storage containers to determine the quality of the fluid. In some examples, the fluid tester 510 may convey results of the test and/or other associated data to another location and/or generate a report based on the test.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus for controlling fluid flow, comprising:
    a fluid regulator having a body defining an inlet port, an outlet port, and an aperture between the inlet port and the outlet port, a bore fluidly coupled to a valve and at least one of the outlet port or the inlet port, wherein the valve is to enable fluid contained within the body to be removed therefrom; and
    a plug that threadably engages a second aperture of the body and at least partially defines a flow path between the inlet port and the outlet port, a surface of the plug is substantially flush with an inner surface of the body to enable fluid to flow between the inlet port and the outlet port substantially unaffected by the plug, the plug comprising an externally accessible flange to enable the plug to be coupled to and removed from the second aperture, the plug being removable to enable access to a fastener within the fluid regulator through the second aperture, wherein the second aperture is different than the bore.

2. The apparatus as defined in claim 1, wherein the bore is to receive a threaded coupling.

3. The apparatus as defined in claim 1, wherein the bore is defined by the plug.

4. The apparatus as defined in claim 1, wherein the bore is defined by the body.

5. The apparatus as defined in claim 1, wherein an opening of the bore is adjacent to a surface of one of the inlet port or the outlet port.

6. The apparatus as defined in claim 1, wherein the valve comprises a ball valve.

7. The apparatus as defined in claim 1, wherein a sample obtained from the bore is to be stored in one or more storage containers.

8. The apparatus as defined in claim 7, further comprising a tester to test at least a portion of the sample contained in the one or more storage containers.

9. The apparatus as defined in claim 1, wherein the valve further comprises a quick-disconnect coupling.

10. The apparatus as defined in claim 1, further comprising an actuator to actuate the valve to obtain a sample to be tested.

11. The apparatus as defined in claim 1, further comprising an actuator to actuate the valve based on a time interval to obtain and test fluid contained within the body.

12. The apparatus of claim 1, further comprising a reservoir to contain lubricant, the reservoir to be fluidly coupled to the inlet port.

13. The apparatus of claim 1, wherein the fluid regulator comprises a spring biased actuator to control a position of a second plug, the second plug being movable relative to the aperture to control fluid flow between the inlet port and the outlet port.

14. A method of removing fluid contained within a fluid regulator, comprising:
    opening a valve to remove fluid from within a fluid regulator, wherein the valve is fluidly coupled to a body of the fluid regulator, and wherein the fluid regulator comprises an inlet port, an outlet port, and an aperture between the inlet port and the outlet port, a bore fluidly coupled to a valve and at least one of the outlet port or the inlet port, the fluid regulator being coupled to an actuator, a plug threadably engages a second aperture of the body and at least partially defines a flow path between the inlet port and the outlet port, the plug comprises an externally accessible flange to enable the plug to be coupled to and removed from the second aperture; and removing the plug from the second aperture, via the flange, to enable a fastener to be accessed within the fluid regulator through the second aperture.

15. The method as defined in claim 14, further comprising coupling a flowline to a quick-disconnect coupling of the valve.

16. The method of claim 14, wherein opening the valve to remove fluid from within the fluid regulator comprises automatically opening the valve based on a predetermined time interval.

17. The method of claim 14, wherein a profile of the flow path defined by the plug and the body is substantially continuous to enable fluid to flow between the inlet port and the outlet port substantially unaffected by the plug.

18. The method of claim 14, wherein a coupling at least partially extends through the plug to couple the valve to the body.

19. The method as defined in claim 14, further comprising closing the valve to substantially prevent fluid flow from within the fluid regulator.

20. An apparatus for controlling fluid flow, comprising:
a fluid regulator having a body defining an inlet port, an outlet port, and an aperture between the inlet port and the outlet port, a fluid plug being moveable relative to the aperture to control fluid flow through the aperture between the inlet port and the outlet port, the body further defining a bore fluidly coupled to a valve and at least one of the outlet port or the inlet port, wherein the valve is to enable fluid contained within the body to be removed therefrom and, wherein a second plug threadably engages a second aperture of the body and at least partially defines a flow path between the inlet port and the outlet port, the second plug comprising an externally accessible flange to enable the second plug to be coupled to and removed from the second aperture, the second aperture sized to enable service access to the fluid plug through the second aperture when the second plug is removed; and
a controller to control an actuator and to generate a report based on a sample obtained from the valve.

21. The apparatus as defined in claim 20, wherein the actuator is to actuate the valve based on a time interval.

22. The apparatus as defined in claim 20, wherein the sample obtained from the bore is to be stored in one or more storage containers.

23. The apparatus as defined in claim 22, further comprising a tester to test at least a portion of the sample contained in the one or more storage containers.

24. The apparatus as defined in claim 20, wherein the bore is defined by the body.

25. The apparatus as defined in claim 20, wherein an opening of the bore is adjacent to a surface of one of the inlet port or the outlet port.

26. The apparatus as defined in claim 20, wherein the valve further comprises a quick-disconnect coupling.

27. The apparatus of claim 20, wherein a profile of the flow path defined by the second plug and the body is substantially continuous to enable fluid to flow between the inlet port and the outlet port substantially unaffected by the second plug.

28. An apparatus for controlling fluid flow, comprising:
a fluid regulator having a body defining an inlet port, an outlet port, and an aperture between the inlet port and the outlet port, a bore fluidly coupled to a valve and at least one of the outlet port or the inlet port, wherein the valve is to enable fluid contained within the body to be removed therefrom;
a plug that threadably engages a second aperture of the body and at least partially defines a flow path between the inlet port and the outlet port, a surface of the plug is substantially flush with an inner surface of the body to enable fluid to flow between the inlet port and the outlet port substantially unaffected by the plug, the plug comprising an externally accessible flange to enable the plug to be coupled to and removed from the second aperture, the plug being removable to enable access to a fastener within the fluid regulator through the second aperture, wherein the second aperture is different than the bore;
an actuator to actuate the valve to obtain a sample to be tested; and
a controller to control the actuator and to generate a report based on the sample obtained.

* * * * *